(12) United States Patent
Kim et al.

(10) Patent No.: US 9,010,661 B2
(45) Date of Patent: Apr. 21, 2015

(54) WASHER NOZZLE FOR VEHICLE

(71) Applicant: Hyundai Motor Company, Seoul (KR)

(72) Inventors: Soo Nam Kim, Seoul (KR); Jae Hyun An, Seosan-si (KR); Jin Hee Lee, Seoul (KR)

(73) Assignee: Hyundai Motor Company, Seoul (KR)

(*) Notice: Subject to any disclaimer, the term of this patent is extended or adjusted under 35 U.S.C. 154(b) by 229 days.

(21) Appl. No.: 13/685,289

(22) Filed: Nov. 26, 2012

(65) Prior Publication Data

US 2014/0042243 A1 Feb. 13, 2014

(30) Foreign Application Priority Data

Aug. 8, 2012 (KR) ........................ 10-2012-0086605

(51) Int. Cl.
*B05B 1/10* (2006.01)
*B60S 1/46* (2006.01)
*B60S 1/52* (2006.01)
*B05C 5/00* (2006.01)
*B05B 9/00* (2006.01)
*B60S 1/48* (2006.01)

(52) U.S. Cl.
CPC . *B60S 1/52* (2013.01); *B05C 5/001* (2013.01); *B05B 9/002* (2013.01); *B60S 1/488* (2013.01); *B60S 1/48* (2013.01)

(58) Field of Classification Search
USPC .................. 239/128, 130, 135, 284.1, 284.2; 392/465, 485; 15/250.01, 250.05
See application file for complete search history.

(56) References Cited

U.S. PATENT DOCUMENTS

| 4,212,425 A | * | 7/1980 | Schlick | ........................ 239/284.1 |
| 5,979,796 A | * | 11/1999 | Ponziani et al. | ........... 239/284.1 |
| 6,220,524 B1 | * | 4/2001 | Tores et al. | ................... 239/130 |

FOREIGN PATENT DOCUMENTS

| EP | 0 123 103 B1 | 2/1988 |
| JP | 10-236283 A | 9/1998 |

* cited by examiner

*Primary Examiner* — Steven J Ganey
(74) *Attorney, Agent, or Firm* — Morgan, Lewis & Bockius LLP

(57) ABSTRACT

A washer nozzle includes a heat emitting unit for smoothly washing a glass in a winter season is installed. The washer nozzle for a vehicle which, by realizing a new type of washer nozzle to which an integral structure of a heat conductor and a nozzle cover is applied through insert injection-molding of the heat conductor is applied and to which a structure where a heat emitter is firmly fastened to the housing by using a structure in the housing is applied, can improve a washer liquid ejecting performance through an increase in a heat transfer efficiency inside the nozzle and reduce the number of processes and a defect rate through fixing of the heat emitter at an optimum location, thereby improving quality.

5 Claims, 5 Drawing Sheets

WASHER NOZZLE FOR VEHICLE

CROSS-REFERENCE TO RELATED APPLICATION

The present application claims priority of Korean Patent Application Number 10-2012-0086605 filed Aug. 8, 2012, the entire contents of which application is incorporated herein for all purposes by this reference.

BACKGROUND OF INVENTION

1. Field of Invention

The present invention relates to a washer nozzle for a vehicle, and more particularly, to a washer nozzle in which a heat emitting unit for smoothly washing a glass in a winter season is installed.

2. Description of Related Art

In general, a washer nozzle is a unit for ejecting a washer liquid onto a front glass of a vehicle to remove foreign substances attached to the front glass, allowing a drive to secure a front view field.

Such a washer nozzle may employ a 2-WAY method or a 3-WAY method, and functions to eject a proper amount of washer liquid to a wide area on a front glass in a short time.

The washer nozzle generally includes a suction port to which a tube extending from a washer liquid pump extends is connected, a washer liquid passage for guiding a flow of a washer liquid introduced through the suction port to an upper side, a nozzle body having an outlet from which the washer liquid guided through the washer liquid passage is finally ejected, and a nozzle cover for fixing the nozzle body.

Thus, a front view field can be secured by ejecting the washer liquid supplied from the washer liquid pump to the front glass through the washer nozzle and wiping out foreign substances attached to the front glass while driving a wiper blade at the same time.

Meanwhile, when a washer nozzle is used in a freeze-up zone or a winter season, it is often difficult to wash a front glass because a washer liquid left in the washer nozzle is frozen to cause a washer liquid ejection defect.

Accordingly, some products where a heat emitter and a heat conductor are applied to an ejection nozzle are being suggested as units for smoothly securing a view field during a travel of a vehicle while smoothly washing a front glass in a winter season.

For example, European Patent No. 0123103, Japanese Patent Application Publication No. 1998-236283, Japanese Patent Application Publication No. 1993-088648, and Korean Utility Model Application Publication No. 1999-0006449 disclose ejection nozzles to which a heat emitter and a heat conductor are applied.

However, the ejection nozzles according to the related art employ a structure in which a heat conductor and a nozzle cover are separated from each other, and thus they are disadvantageous in terms of manufacturing efficiency and assembling efficiency and fail to solve a problem of an increase in defect rate due to a deflection of a heat emitter.

For example, a method of injecting a plastic resin into a housing to solidify the plastic resin after a heat emitter is inserted into the housing has the following problems.

First, it is difficult to realize a uniform heating emitting performance because an assembling distribution is not considered.

That is, a leftward, rightward, upward, or downward distribution occurs when a heat emitter is fixed because a heat emitter fixing structure is not present when a resin is injected.

Second, a heat emitter/resin fixing method does not employ a structure for preventing a surface expansion due to overheating of the heat emitter.

That is, a nozzle housing may be damaged due to a thermal expansion of the heat emitter.

Third, a maintenance performance is not good because all nozzle assembly parts need to be replaced when a repair is necessary due to a defect of the heat emitter.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with prior art. Various aspects of the present invention provide for a washer nozzle for a vehicle which, by realizing a new type of washer nozzle to which an integral structure of a heat conductor and a nozzle cover is applied through insert injection-molding of the heat conductor is applied and to which a structure where a heat emitter is firmly fastened to the housing by using a structure in the housing is applied, can improve a washer liquid ejecting performance through an increase in a heat transfer efficiency inside the nozzle and reduce the number of processes and a defect rate through fixing of the heat emitter at an optimum location, thereby improving quality.

Various aspects of the present invention provide for a washer nozzle for a vehicle, including: a nozzle cover having an ejection hole; and a nozzle body having a washer liquid passage, wherein an insert injection-molded cover integrated heat conductor is provided within the nozzle cover, and a heat emitter for providing heat to the heat conductor is assembled to contact an exposure surface at a lower side of the heat conductor while being inserted into a heat emitter installing groove formed in the nozzle cover.

The heat emitter may include a heat emitting element and a power connector for supplying heat to the heat conductor, and a housing inserted into the heat emitter installing groove of the nozzle cover while supporting the heat emitting element and the power connector, and support pieces for supporting the heat emitting element therebetween while contacting opposite surfaces of the heat emitting element are formed at opposite sides of the inner surface of the housing.

The support pieces of housing may have an arc shape supported by a fixing end connected to the housing body to resiliently support the heat emitting element.

Wherein wings inclinedly extending downward from opposite sides of a body of the heat conductor may be provided in the body of the heat conductor so that both the central ejection hole through the body and the ejection holes at opposite sides through the opposite wings are sufficiently heated.

The washer nozzle for a vehicle provided by the present invention may have the following features.

First, as the heat conductor may be insert injection-molded in the nozzle cover and the heat emitter is provided in a separate housing to be assembled in the nozzle cover, a washer ejection performance can be enhanced in a winder season, for example, by reducing the number of processes and process costs and enhancing a heat transfer efficiency inside the nozzle.

Second, as the heat emitter may be firmly fastened to an interior structure of the housing, a post-deformation of the heat emitter can be prevented when a resin is filled.

That is, a heat transfer efficiency can be secured and a post-deformation can be prevented by applying a fixing structure of the heat emitter at an optimum location. Thus, a quality can be secured by reducing a defect rate.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
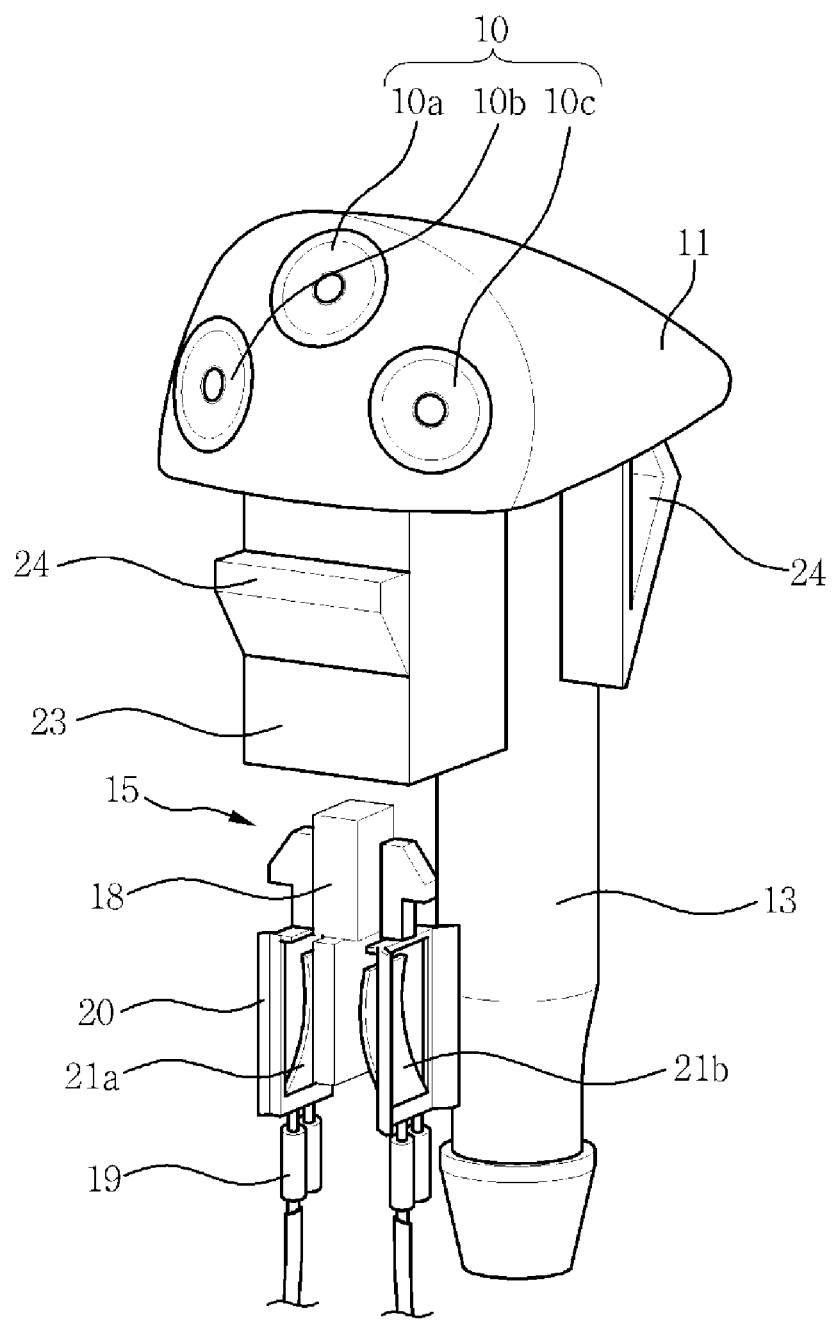
FIG. 1 is a perspective view illustrating an exemplary washer nozzle for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
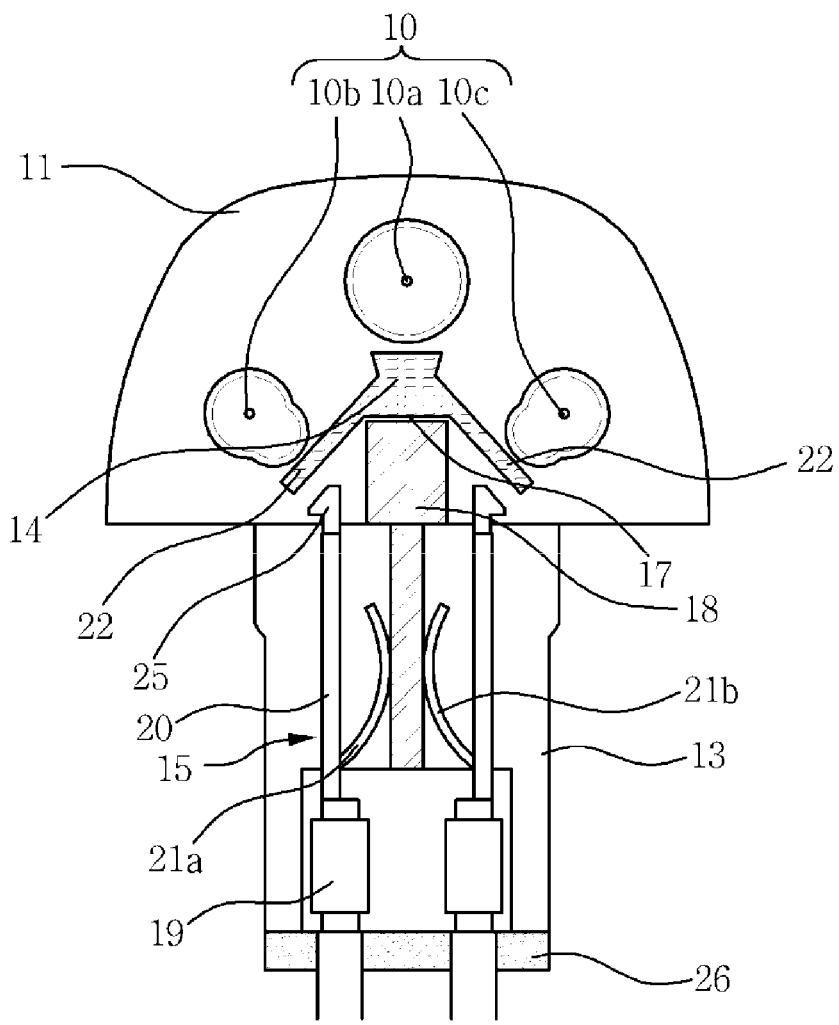
FIG. 2 is a front sectional view illustrating the exemplary washer nozzle for a vehicle according to the present invention.
Figure 3:
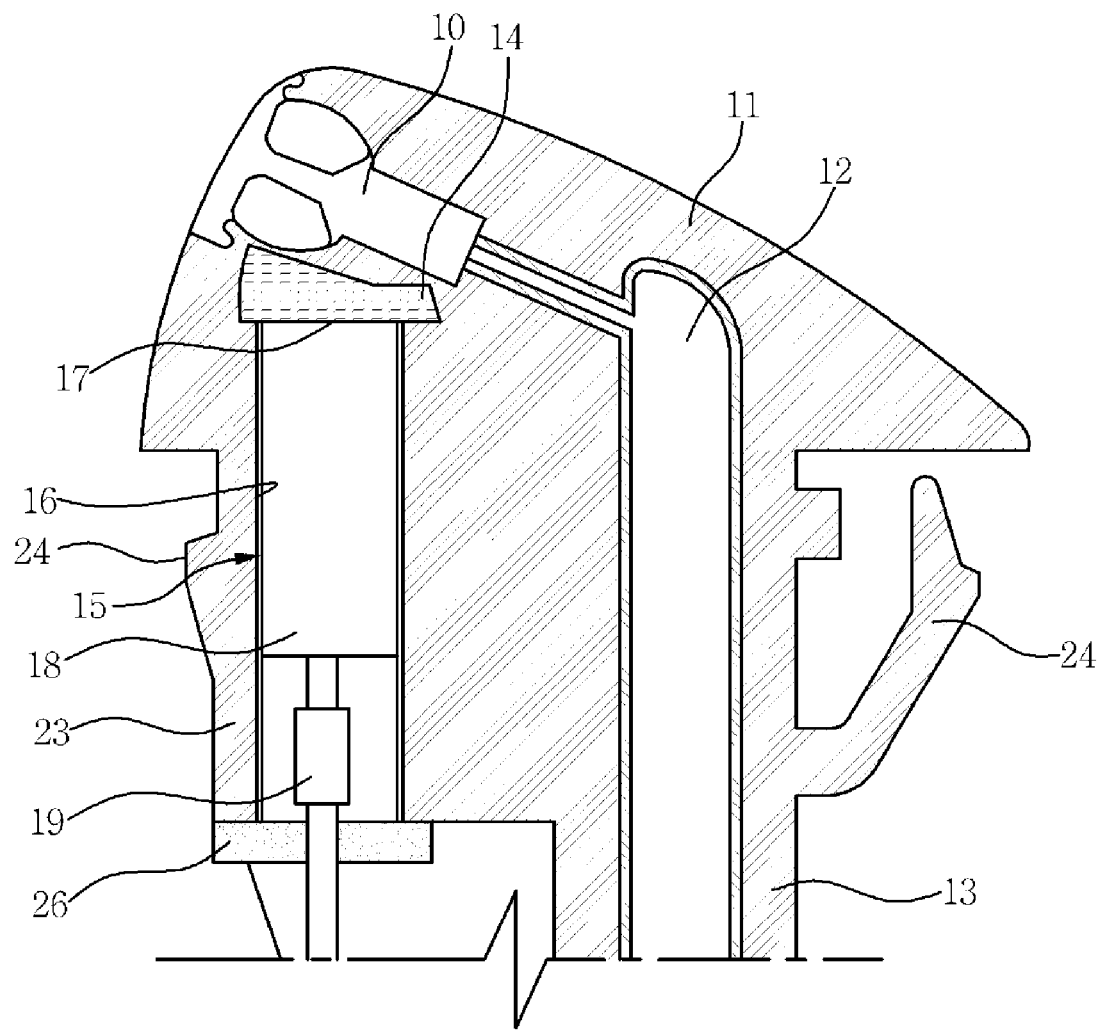
FIG. 3 is a side sectional view illustrating the exemplary washer nozzle for a vehicle according to the present invention.

FIG. 1 is a perspective view illustrating a washer nozzle for a vehicle according to various embodiments of the present invention. FIGS. 2 and 3 are a front sectional view and a side sectional view illustrating the washer nozzle for a vehicle according to various embodiments of the present invention.

As illustrated in FIGS. 1 to 3, the washer nozzle has a structure including a heat conductor integrally formed with a nozzle cover and a heat emitter assembled in the nozzle cover, and can increase a heat transfer efficiency of an interior part of the nozzle and prevent post-deformation through fixing of a heat emitting element at an optimum location.

To achieve this, the washer nozzle basically includes a combination of a nozzle cover 11 on an upper side and a nozzle body 13 on a lower side. A plurality of ejection holes 10, for example, three ejection holes 10a, 10b, and 10c forming a triangular disposition is formed in the nozzle cover 11, and a washer liquid passage 12 communicated with the ejection holes 10 is formed in the nozzle body 13.

A vertical block body 23 parallel to the nozzle body 13 extends downward from a bottom surface of a front end of the nozzle cover 11 by a predetermined length, and a heat emitter installing groove 16 for insertion of the heat emitter 15 which will be described below is formed within the block body 23.

The washer nozzle may be coupled to or installed in a hood panel or a cowl top by using nozzle hooks 24 formed on a rear surface of an upper end of the nozzle body 13 and a front surface of the block body 23.

In particular, a thermal conductor 14 formed of a copper material is inserted into and installed in the nozzle cover 11 to conduct heat to a periphery of the ejection holes 10 in the nozzle cover 11.

The heat conductor 14 is installed in a cover integrated structure while being inserted and injection-molded when the nozzle cover 11 is formed. A bottom surface of a body of the heat conductor 14 forms a bottom surface of the heat emitter installing groove 16 formed in the block body 23 of the nozzle cover 11.

That is, the bottom surface of the body of the heat conductor 14 is exposed through the heat emitter installing groove 16 as an exposure surface 17, and heat is transferred to the exposure surface 17 while the exposure surface 17 contacts an upper end surface of the heat emitting element 18 of the heat emitter 15.

The heat conductor 14 may take a form in which heat can be uniformly applied to the three ejection holes 10a, 10b, and 10c in the nozzle cover 11.

For example, wings 22 inclined downward at a predetermined angle are provided at opposite sides of the body of the heat conductor 14, respectively, and the opposite wings 22 may extend to locations right below the ejection holes 10b and 10c located at opposite sides.

Accordingly, the body of the heat conductor 14 is located below the central ejection hole 10a and the opposite wings 22 extending from the body are located below the ejection holes 10b and 10c at opposite sides, and thus the ejection holes can be effectively prevented from freezing while peripheries of the ejection holes can be sufficiently heated by heat of the heat conductor 14 with balance.

The heat emitter 15 is provided as a unit for supplying heat to the heat conductor 14.

The heat emitter 15 takes an assembly form in which a thermoelectric element 18 is disposed inside the housing 20. For example, as a shape of a housing 20 including opposite longitudinal plate bodies and an upper transverse member is formed by injection of a resin while the thermoelectric element 18 is inserted, the heat emitter 15 integrally formed with the housing 20 and the heat emitting element 18 may be formed. For example, the housing may be injection molded in situ about the thermoelectric element.

Then, the housing 20 may be formed of a plastic material without a heat transfer function.

A power connector 19 on a "+" side and a "−" side for supplying electric power to the heat emitting element 18 is formed at a lower end of the housing 20, and the power connector 19 may be electrically connected to the thermoelectric element 18 through wires extending along an interior of the housing.

The heat emitter 15 is assembled to be inserted from the heat emitter installing groove 16 in the nozzle cover 11 from a lower side to an upper side, and as a housing hook 25 at an upper end of the housing 20 is caught by a catching end formed on an inner wall of the heat emitter installing groove 16, the heat emitter 15 can be prevented from being separated from the heat emitter installing groove 16 while being completely inserted into the heat emitter installing groove 16.

After the heat emitter is completely assembled, the heat emitting element 18 of the heat emitter 15 assembled as described above contacts the exposure surface 17 of the heat conductor 14 through an upper end thereof, and thus heat emitted from the heat emitting element 18 can be transferred to the heat conductor 14 through the exposure surface 17.

Here, the heat emitting element 18 may be applied to a known PTC device, and an opened portion of a lower end of the heat emitter installing groove 16 may be finished by a waterproof cover 26 after the heat emitter 15 is inserted.

In particular, support pieces 21a and 21b are provided at opposite sides of an inner side surface of the housing 20 to serve to fix a location of the heat emitting element 18.

The support pieces 21a and 21b have a gently curved arc shape while being supported by a fixed end connected to the housing body, that is, the longitudinal plate body, and the opposite support pieces 21a and 21b can resiliently support the heat emitting element 18 therebetween through a convex surface.

Accordingly, the heat emitting element 18 can maintain a location (when the heat emitter is inserted) where the heat emitting element 18 can accurately contact the heat conductor 14 while being stably fixed by a force applied by the opposite support pieces 21a and 21b and being located at an optimum location, for example, at an accurate vertical posture and a left and right center line of the housing 20.

Figure 4:
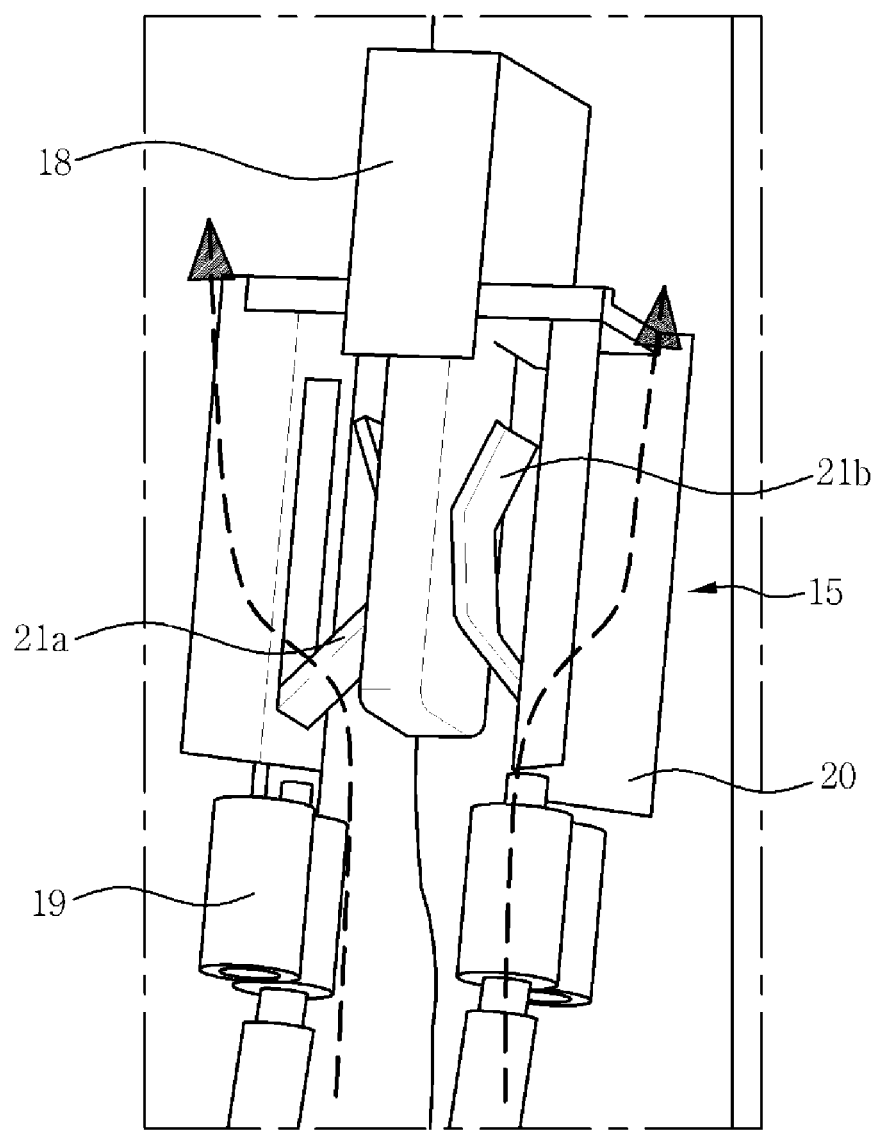
FIG. 4 is a schematic diagram illustrating an exemplary state change against a resin filling direction of a heat emitter according to the present invention.

That is, as can be seen in FIG. 4, when a resin for forming the housing is filled, the opposite support pieces 21a and 21b fix the heat emitting element 18. Thus, a deflection and a movement of the heat emitting element 18 due to a resin filling pressure flowing in the directions of arrows can be prevented, which consequently can lower a defect rate through prevention of such a post-deformation.

Figure 5:
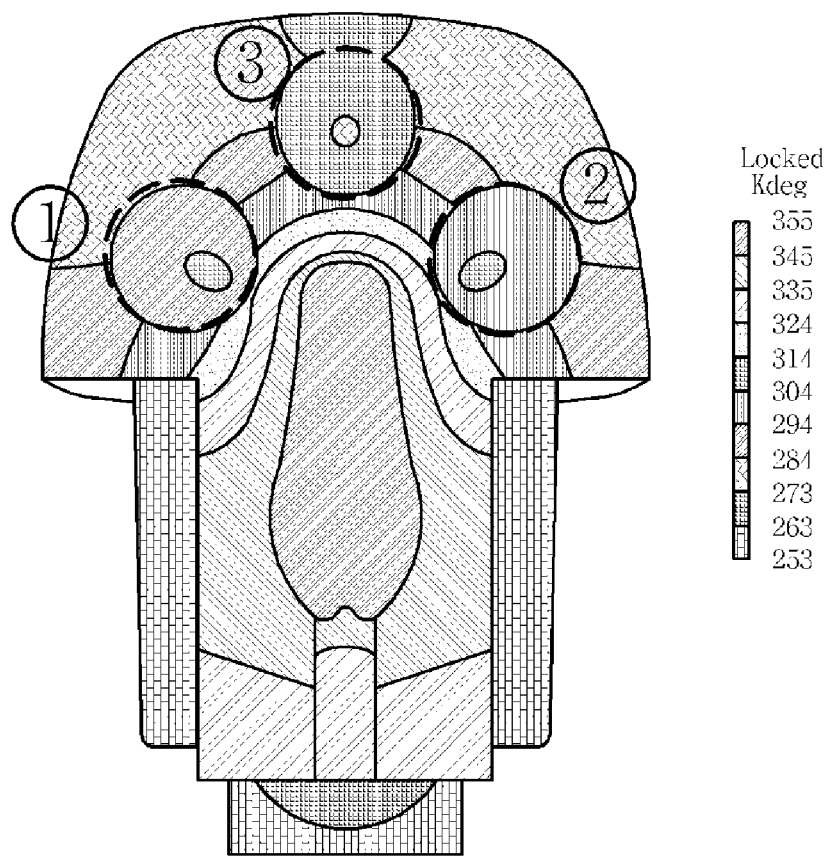
FIG. 5 is a schematic diagram illustrating an exemplary temperature distribution for ejection holes of the washer nozzle for a vehicle according to the present invention.
Figure 5:
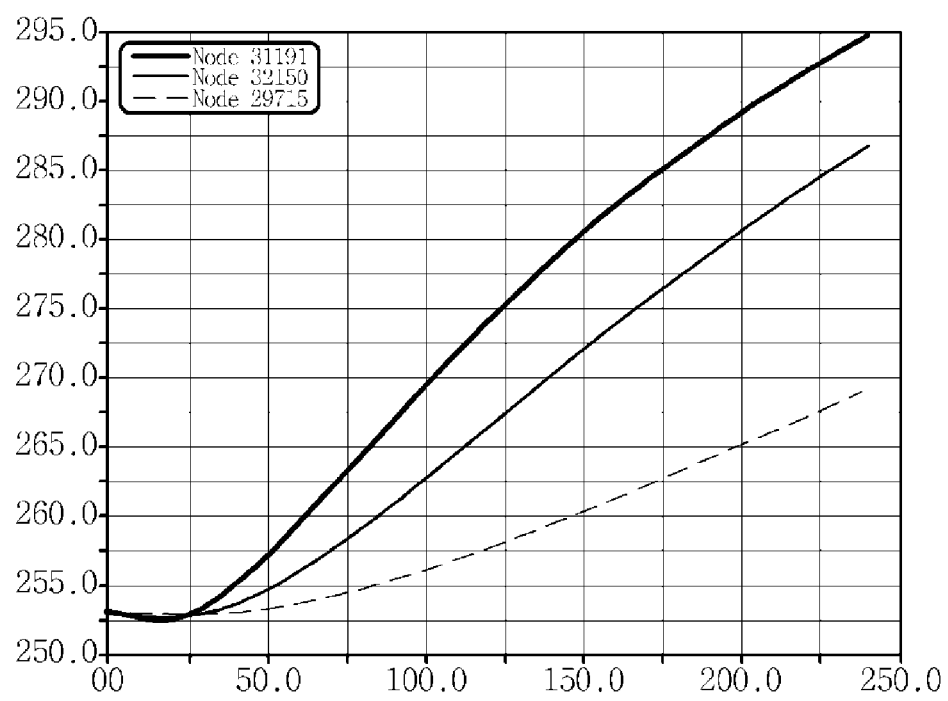

FIG. 5 is a schematic diagram illustrating a temperature distribution for ejection holes of the washer nozzle for a vehicle according to various embodiments of the present invention.

FIG. 5 shows an analysis of temperature distribution for the three ejection holes through which a washer liquid is discharged in the washer nozzle to which the heat emitter and the heat conductor are applied.

It can be seed in the left simulation and the right graph that the nozzle ejection holes are thawed within approximately 3 minutes after heat emission from a freezing state of an exterior temperature of −20° C.

Thus, when the washer nozzle is operated to wash a front glass in a freeze-up zone or in a winter season, if a drive switches on a switch before the washer nozzle is operated, the heat emitting element 18 is heated while electric power is supplied to the heat emitting element 18 of the heat emitter 15. Accordingly, the heat is transferred to the heat conductor 14 contacting the heat emitting element 18 and thin ices attached to a periphery of the nozzle is thawed at the same time, which consequently allows the washer nozzle to properly perform its own function normally even in a freeze-up.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A washer nozzle for a vehicle, comprising:
   a nozzle cover having a plurality of ejection holes; and
   a nozzle body having a washer liquid passage;
   wherein an integrated insert injection-molded cover and heat conductor is provided within the nozzle cover, and a heat emitter for providing heat to the heat conductor contacts an exposure surface at a lower side of the heat conductor while inserted into a heat emitter installing groove formed in the nozzle cover,
   wherein the heat conductor is configured to extend to a lower side of each of the plurality of ejection holes to uniformly transfer heat generated from the heat emitter to each ejection hole.

2. The washer nozzle of claim 1, wherein the heat emitter includes a heat emitting element and a power connector for supplying heat to the heat conductor, and a housing inserted into the heat emitter installing groove of the nozzle cover while supporting the heat emitting element and the power connector, and support pieces for supporting the heat emitting element therebetween while contacting opposite surfaces of the heat emitting element are formed at opposite sides of an inner surface of the housing.

3. The washer nozzle of claim 2, wherein the support pieces of the housing have an arc shape supported by a fixing end connected to a housing body to resiliently support the heat emitting element.

4. The washer nozzle of claim 2,
   wherein the plurality of ejection holes include a central ejection hole and at least two side ejection holes disposed at a periphery of the central ejection hole, and
   wherein wings extend downward at an incline from opposite sides of a body of the heat conductor in the body of the heat conductor so that both the central ejection hole through the body and the side ejection holes at opposite sides through the opposite wings are heated.

5. The washer nozzle of claim 1,
   wherein the plurality of ejection holes include a central ejection hole and at least two side ejection holes disposed at a periphery of the central ejection hole, and
   wherein wings extend downward at an incline from opposite sides of a body of the heat conductor in the body of the heat conductor so that both the central ejection hole through the body and the side ejection holes at opposite sides through the opposite wings are heated.

* * * * *